(No Model.)
R. T. SMITH.
BRAKE ACTUATING DEVICE.
No. 446,935. Patented Feb. 24, 1891.
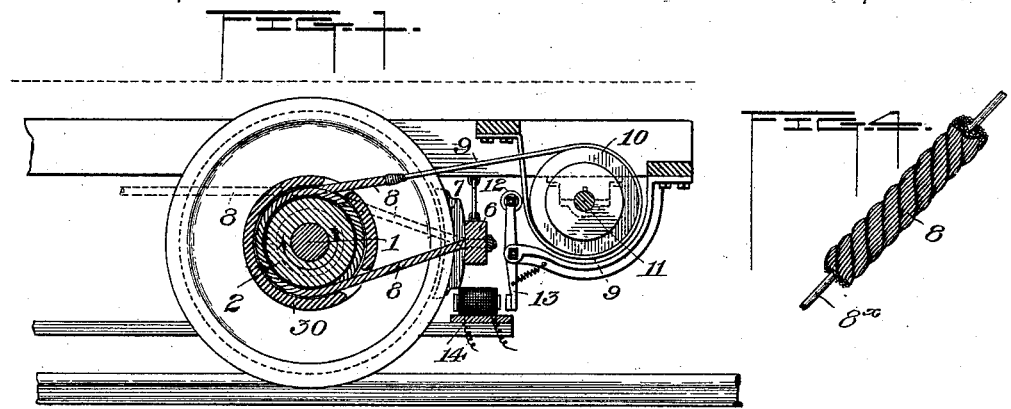
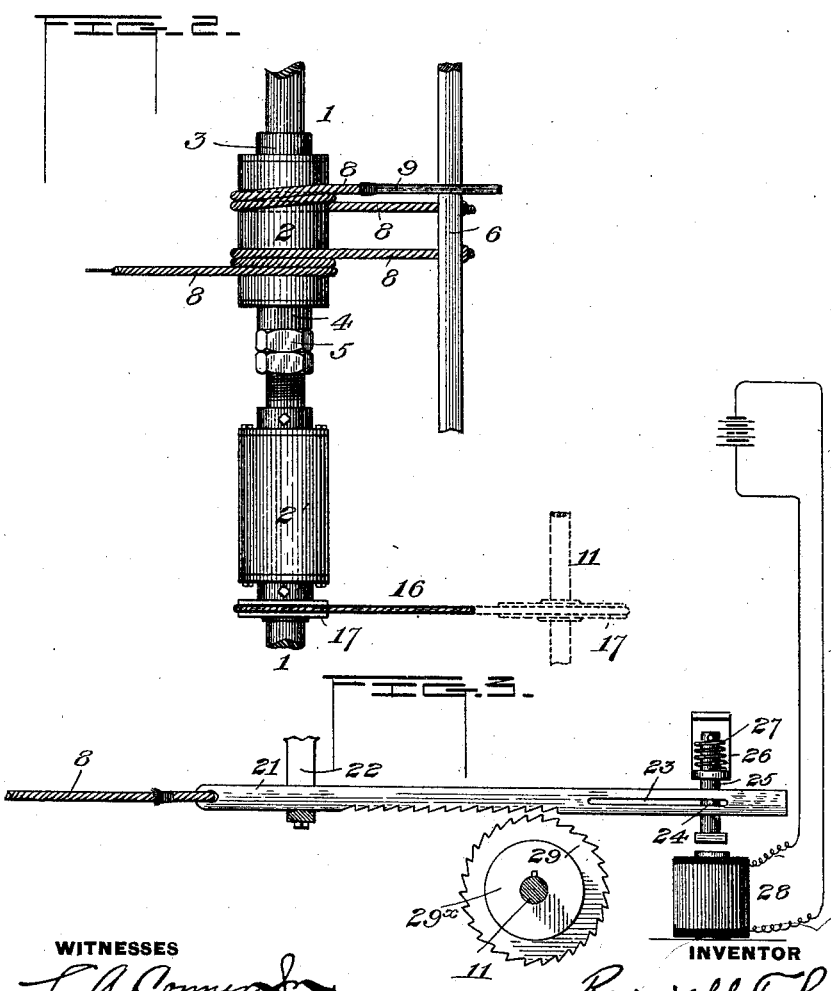
WITNESSES
INVENTOR
Roswell T. Smith
by William B. Greeley
Atty

UNITED STATES PATENT OFFICE.

ROSWELL T. SMITH, OF NASHUA, NEW HAMPSHIRE.

BRAKE-ACTUATING DEVICE.

SPECIFICATION forming part of Letters Patent No. 446,935, dated February 24, 1891.

Application filed November 18, 1890. Serial No. 371,852. (No model.)

*To all whom it may concern:*

Be it known that I, ROSWELL T. SMITH, of Nashua, in the county of Hillsborough and State of New Hampshire, have invented certain new and useful Improvements in Brake-Actuating Devices, of which the following is a specification.

The object of my invention is to provide means for setting brakes from some rotating part, as the axle of a railway-car, and to enable the application of the brake to be controlled by a slight force, as the pull of an electro-magnet.

The invention consists in the devices hereinafter described and claimed.

In the accompanying drawings, wherein I have shown convenient embodiments of my invention as applied to a railway-car, Figure 1 is a sectional elevation of a portion of a car-truck. Fig. 2 is a plan view of a portion of the same. Fig. 3 is a detail view of a different form of one part of the arrangement shown in Fig. 1, and Fig. 4 is a detail.

In carrying my invention into practice upon railway-cars I place loosely upon the axle 1 a drum 2 between a fixed collar 3 and a longitudinally-movable collar 4. Lock-nuts 5 are provided to act upon the collar 4, whereby the frictional contact between the drum and the axle or its collars can be regulated. The brake-bar 6, having the brake-shoe 7, is as usual. A flexible connection 8, preferably a rope having a core $8^\times$ of spring-steel, (see Fig. 4,) is attached to the brake-bar, and is passed with two or more turns about the drum 2. While the connector 8 remains slack there will be no friction between it and the drum, and the brake-bar will not be moved to set the brake. The spring-core of the connector tends to keep the coils of the connector free from the drum, and the encompassing concentric shield 30 (shown in Fig. 1) co-operates with the spring-core to insure the freedom of the coils from the drum at all points about the circumference.

A slight pull upon the free end of the connector 8 sufficient to overcome the resilience of the core will produce great friction between the connector and the drum, and if continued the brake will be set with great force. When the brake is fully set, the friction between the drum and the collars on the axle will be overcome and the drum will cease to rotate, thereby preventing the breakage of any of the parts. The means I have shown in Figs. 1 and 2 for producing this necessary pull upon the connector 8 are as follows: To the end of the connector 8 is secured a second connector 9, preferably a strap, which is passed loosely about a wheel 10 upon a shaft 11 and secured at any convenient point. The shaft 11 is rotated continuously, being driven by any convenient means, as the belt 16 and pulleys 17, from the axle 1. Normally there is not sufficient friction between the belt 9 and wheel 10 to overcome the resilience of the spring-wire in the coils about the drum 2; but if the belt be pressed against the wheel at one point the friction will be increased sufficiently to give the necessary pull upon the connector 8. To exert this pressure I employ an idler 12, mounted upon a lever 13, the lower end of which forms or bears the armature of an electro-magnet 14, which may be under the control of the engineer of the train or the operator of the machine.

In Fig. 1 I have shown but one wheel 10 and connected parts; but it will be understood that in order to apply the brake, whether the car be moving in one direction or the other, it will be necessary to attach to the brake-bar a second connector 8, which is passed about the drum, as shown, in a direction opposite to that of the first connector, and is provided with its own belt, wheel, lever, and magnet, similar to those shown.

In Fig. 2 I have shown a second drum 2', fixed upon the axle, which may be provided with the connectors and other parts (shown in Fig. 1) for use in emergencies.

In Fig. 3 I have shown a device for tautening the connector 8 which on some accounts is preferable to that shown in Fig. 1. The free end of the connector is secured to a second connector 2' which is a ratcheted bar sliding in a guide 22, and having at one end a slot 23 to receive a pin 24, carried by a plunger 25. The plunger moves in a bracket 26, and forms or bears the armature of an electro-magnet 28, under control of the engineer or operator. Normally the bar is held in the position shown by a spring 27; but when the magnet is energized the bar is drawn into contact with a toothed disk 29, and frictionally held by the collar 29× upon the shaft 11, which may be rotated, as described with reference to Figs. 1 and 2.

It will be seen that by the construction shown in Fig. 3 and by that shown in Fig. 1 the connector 8 is first tautened and then is held taut, the slack being taken up as fast as it is paid out by the rotation of the drum 2, and the brake-bar is drawn toward the wheels until the wheel ceases to rotate or the drum 2 slips upon its shaft.

In the described application of my invention I have shown the drum 2 as mounted upon the shaft or axle bearing the wheels upon which the brake is applied; but it is obvious that it might be mounted upon any rotating shaft.

I claim—

1. The combination of a brake-bar, a rotating drum, as 2, a flexible connector attached to said bar and passed loosely about said drum, whereby said drum normally may rotate freely without affecting said connector, and means to exert a pull upon the free end of said connector to increase the friction between the same and the drum, substantially as described.

2. The combination of a brake-bar, a rotating drum, a flexible resilient connector attached to said bar and passed about said drum, and means to exert a pull upon the free end of said connector, substantially as described.

3. The combination of a brake-bar, a rotating drum, a flexible connector attached to said bar and passed about said drum, a second connector attached to the free end of said first-named connector, a rotating wheel, and means for bringing said second connector into contact with said wheel, substantially as described.

4. The combination of a brake-bar, a rotating drum, a flexible connector attached to said bar and passed about said drum, a ratcheted bar to which the free end of said connector is attached, a rotating toothed wheel, and means to cause the engagement of said bar with said wheel, substantially as described.

5. The combination of a brake-bar, a rotating drum, a flexible connector attached to said bar and passed about said drum, a ratcheted bar to which the free end of said connector is attached, a rotating toothed wheel, and a magnet to draw the bar into engagement with said wheel, substantially as described.

In witness whereof I have hereunto set my hand.

ROSWELL T. SMITH.

Witnesses:
 WILLIAM B. GREELEY,
 EDWARD A. GREELEY.